United States Patent
Chaya

[11] Patent Number: 5,872,766
[45] Date of Patent: Feb. 16, 1999

[54] DEVICE FOR ADJUSTING THE PRELOAD OF A PLATE SPRING FOR AN OPTICAL PICKUP APPARATUS

[75] Inventor: Masahiko Chaya, Yokohama, Japan

[73] Assignee: Canon Kabushiki Kaisha, Tokyo, Japan

[21] Appl. No.: 784,959

[22] Filed: Jan. 16, 1997

Related U.S. Application Data

[63] Continuation of Ser. No. 383,987, Feb. 6, 1995, abandoned.

[30] Foreign Application Priority Data

Feb. 10, 1994 [JP] Japan .................................. 6-016440

[51] Int. Cl.[6] .................................................. G11B 17/02
[52] U.S. Cl. ............................................................ 369/244
[58] Field of Search ............................. 369/40, 158, 244, 369/245, 249, 251, 252, 253, 254; 370/105, 106, 107

[56] References Cited

U.S. PATENT DOCUMENTS

| | | | |
|---|---|---|---|
| 5,008,876 | 4/1991 | Nakagishi | 369/244 |
| 5,208,793 | 5/1993 | Chaya | 369/44.14 |
| 5,210,739 | 5/1993 | Nakagishi | 369/244 |
| 5,297,127 | 3/1994 | Ohtsuka et al. | 369/44.14 |
| 5,305,151 | 4/1994 | Kakimoto et al. | 359/814 |
| 5,375,115 | 12/1994 | Shimegi et al. | 369/244 |

*Primary Examiner*—David D. Davis
*Attorney, Agent, or Firm*—Fitzpatrick, Cella, Harper & Scinto

[57] ABSTRACT

An optical pickup apparatus is guided in a predetermined direction along a pair of guide shafts, and includes a supporting mechanism for supporting the optical pickup relative to the guide shafts, a preloading mechanism for providing a preload force on the supporting mechanism against the guide shafts, and an adjusting mechanism for adjusting the preload force of the preloading mechanism.

4 Claims, 5 Drawing Sheets h' < h, h"

DEVICE FOR ADJUSTING THE PRELOAD OF A PLATE SPRING FOR AN OPTICAL PICKUP APPARATUS

This application is a continuation of application Ser. No. 08/383,987, filed Feb. 6, 1995, now abandoned.

BACKGROUND OF THE INVENTION

1. Field of the Invention

The present invention relates to a moving body provided with a mechanism for exerting a preload on a bearing against a guide shaft, and more particularly to an optical pickup apparatus with an objective lens mounted therein.

2. Related Background Art

Conventional optical pickup apparatus are provided with a preloading mechanism for giving a preload on a support portion (bearing portion) against a guide rail as shown in FIG. 1 to FIG. 4. In the apparatus, rollers 102 as a bearing rotationally supported on a carriage 106 are pressed against a reference shaft 101 with circumferential surfaces thereof being in contact with the reference shaft 101 in cooperation with a preloading roller 104 and a fixed roller 103 also as a bearing with circumferential surfaces thereof being in contact with a support shaft 110 set in parallel with the reference shaft 101, thereby restricting rotation of carriage 106 about the reference shaft.

A preloading plate spring 105 for exerting the above pressing force on the preloading roller 104 is a spring formed of a single spring member in an appropriate shape (in an approximately "V" shape in this example), which is arranged to be deformed in the direction of arrow B in FIG. 2 to generate a preload when the carriage 106 is set between the reference shaft 101 and the support shaft 110 in incorporating the base (not shown) of the apparatus. Since this prior art example employs no mechanism or structure for adjusting the preload force, the preload force is determined by a relative position between the shafts and an amount of deformation of the plate spring. Since machining and assembling of those members involved considerable errors, the spring constant of the plate spring has generally been set to be small, particularly in order to absorb the above errors by deformation of the plate spring.

For pursuing high-speed accessibility of optical disk apparatus, the optical pickup apparatus, however, needs to have a size-decreased moving part and vibration characteristics durable for high-speed operation. In order to achieve this object, the apparatus needs to satisfy such a reciprocal relation that moving resistance of the guide portion should be decreased in access whereas the support stiffness by the plate spring should be increased. Namely, the rolling resistance of the guide rollers should be decreased so as to increase a utilization factor of a motor drive force as a propulsive force of the carriage and at the same time, the support stiffness of the carriage should be increased so as to be ready for high-speed operation in a widened control frequency band. When the support stiffness is increased or when the spring constant is increased, there is a possibility that considerable errors are made in machining and assembling of the shafts and plate spring to cause great differences of the preload force, to reduce an elastic deformation range, or to cause plastic deformation of the plate spring in assembling.

SUMMARY OF THE INVENTION

The present invention has been accomplished under the above circumstances, and an object of the present invention is to provide an optical pickup apparatus provided with adjusting means for adjusting an amount of deformation of a preloading plate spring, whereby a constant preload force can be always set without being affected by the machining accuracy and assembling accuracy of parts, thereby enabling setting of the spring constant high, to widen the control frequency band, and to improve the high-speed accessibility.

The above object of the present invention can be achieved by an optical pickup apparatus as guided in a predetermined direction along a pair of guide shafts, which comprises supporting means for supporting the optical pickup relative to the guide shafts, preloading means for providing a preload on the supporting means against the guide shafts, and adjusting means for adjusting the preload force of the preloading means.

The details will be described in the description below of preferred embodiments.

DETAILED DESCRIPTION OF THE PREFERRED EMBODIMENTS

Figure 1:
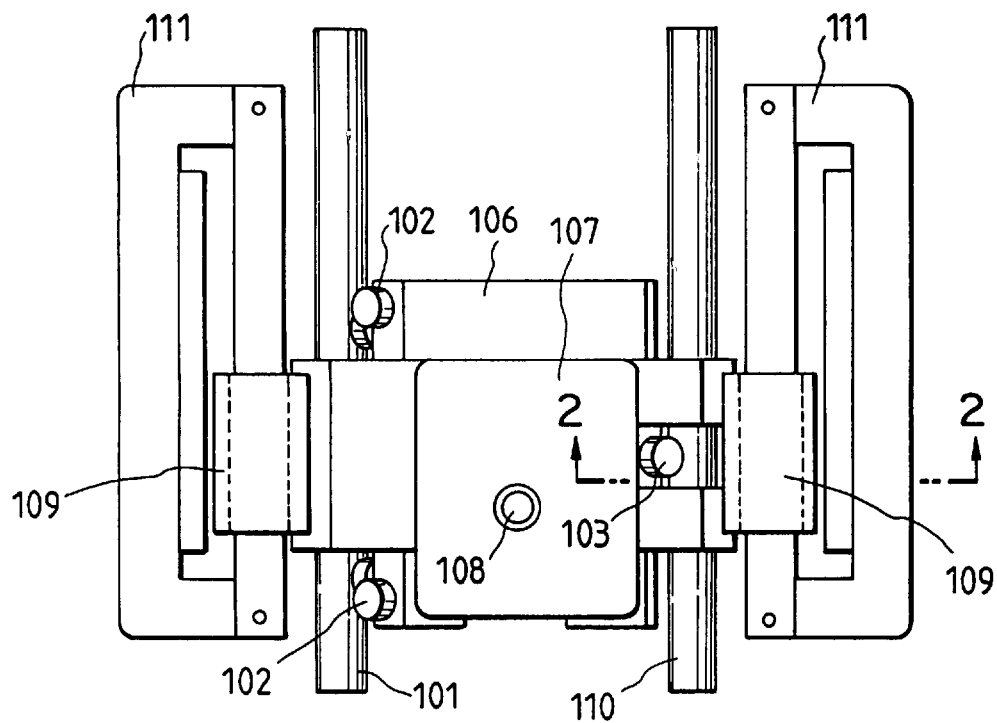
FIG. 1 is a plan view of a prior art example.
Figure 2:
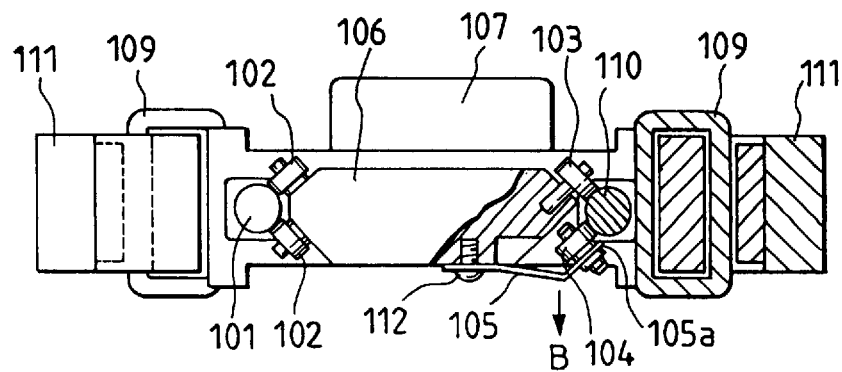
FIG. 2 is a front view, partly in vertical cross section, of the apparatus shown in FIG. 1.
Figure 3:
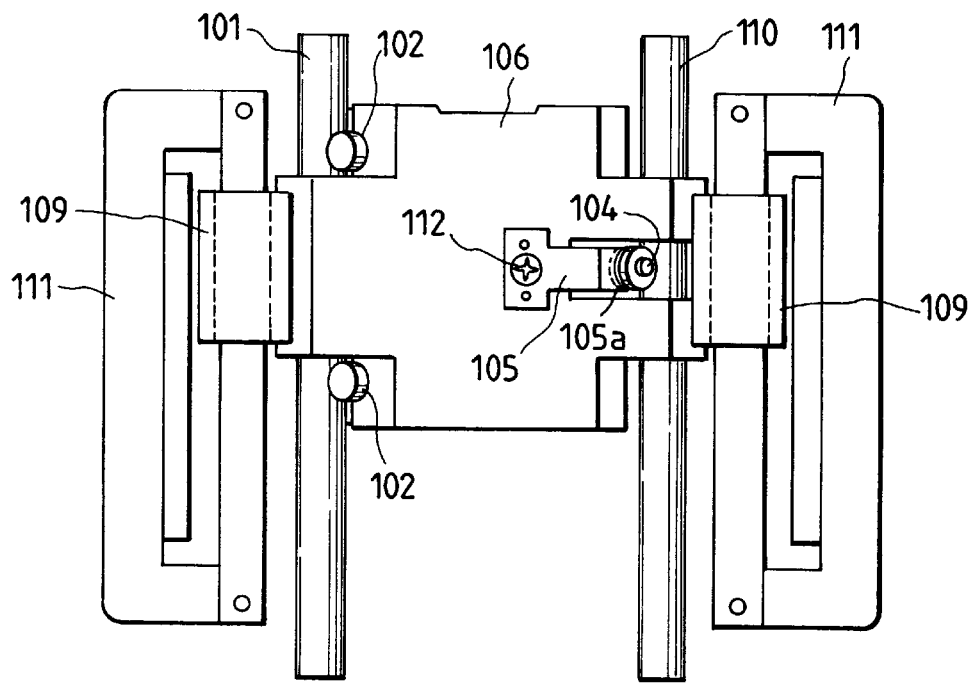
FIG. 3 is a bottom view of the apparatus shown in FIG. 1.
Figure 4:
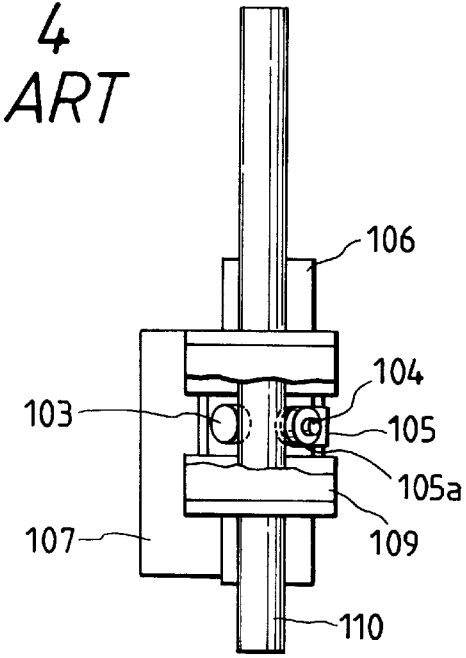
FIG. 4 is a side view of the apparatus shown in FIG. 1.
Figure 5:
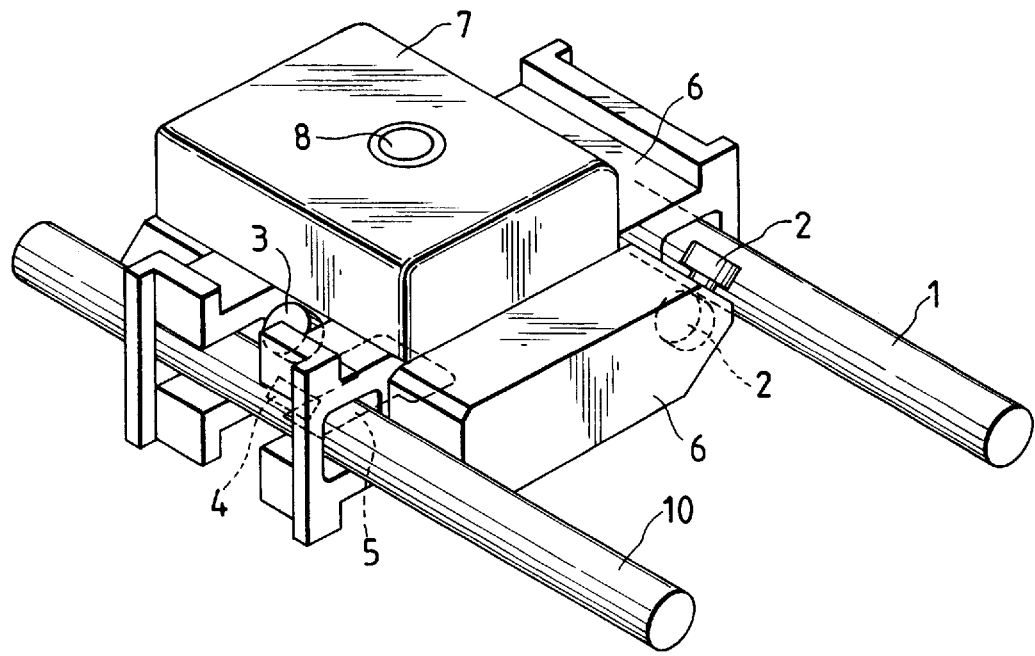
FIG. 5 is a perspective view to show an embodiment of the optical pickup apparatus of the present invention.

The optical pickup apparatus of the present invention will be described in detail with reference to the accompanying drawings. The optical pickup apparatus shown in FIG. 5 is so arranged that an objective lens drive unit 7 for driving an objective lens 8 is mounted on a carriage 6, which is supported on a reference shaft 1 and a support shaft 10 in parallel therewith through supporting rotation rollers 2, 3 and a preloading rotation roller 4, thus being able to move in the radial direction of a disk, that is, in the longitudinal direction of the two shafts.

Figure 6:
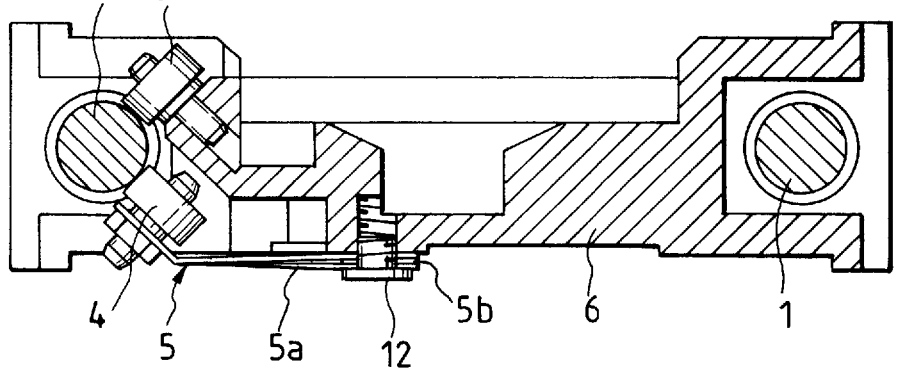
FIG. 6 is a front view in vertical cross section of the apparatus shown in FIG. 5.
Figure 7:
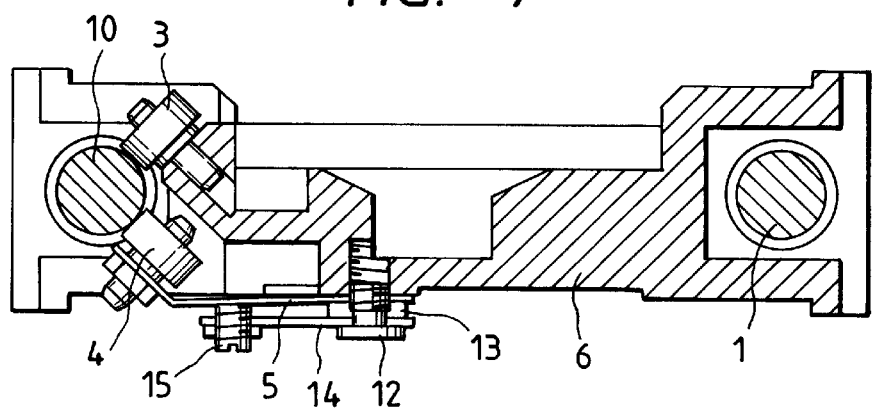
FIG. 7 is a front view in vertical cross section to show another example of the optical pickup apparatus of the present invention.

FIGS. 6 and 7 show cross sections of the carriage 6 in order to show adjusting mechanisms for a preloading plate spring. In the present embodiment the preloading plate spring 5 formed in a nearly "V" shape is fixed to the carriage 6 by a stop screw 12 as a preload adjusting mechanism on the back face opposite to the optical pickup mount surface (top surface) of carriage 6.

In particular, the embodiment of FIG. 6 is arranged in order to place the preloading rotation roller 4 at the distal end of the preloading plate spring 5 against the support shaft 10 so that an auxiliary plate spring 5a for biasing the preloading plate spring 5 is fixed to the carriage 6 by a stop screw 12 through a spring washer 5b, thereby achieving the preload adjusting mechanism as described above.

The preloading plate spring 5 and auxiliary plate spring 5a are shaped so that the free end of the auxiliary plate spring 5a (the end opposite to the end fixed by the stop screw 12) comes into contact with the preloading plate spring 5 upon incorporation of a carriage and so that an amount of deformation of the auxiliary plate spring 5a at the contact portion can be adjusted by changing an amount of screwing of the stop screw 12. Accordingly, the amount of screwing of the stop screw 12 determines the preload force.

The embodiment of FIG. 7 is arranged in order to press the preloading rotation roller 4 at the distal end of the preloading plate spring 5 against the support shaft 10 so that an adjusting screw 15 for biasing the preloading plate spring 5 is attached to an auxiliary member 14 and so that this auxiliary member 14 is fixed to the carriage 6 by the stop screw 12 through a washer 13, thereby achieving the preload adjusting mechanism as a whole. By this mechanism, the deformation amount and support conditions of the preloading plate spring 5 can be changed by adjusting the adjusting screw 12, thereby permitting the preload adjustment of the preloading rotation roller 4 against the support shaft 10 as described above.

Figure 8:
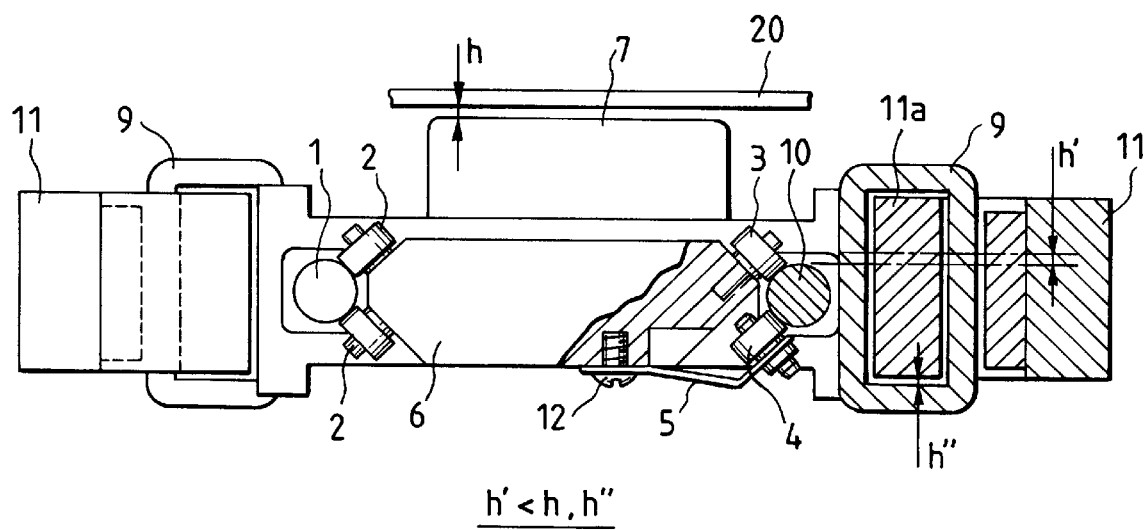
FIGS. 8 and 9 are front views partly in vertical cross section to show still another example of the optical pickup apparatus of the present invention.
Figure 9:
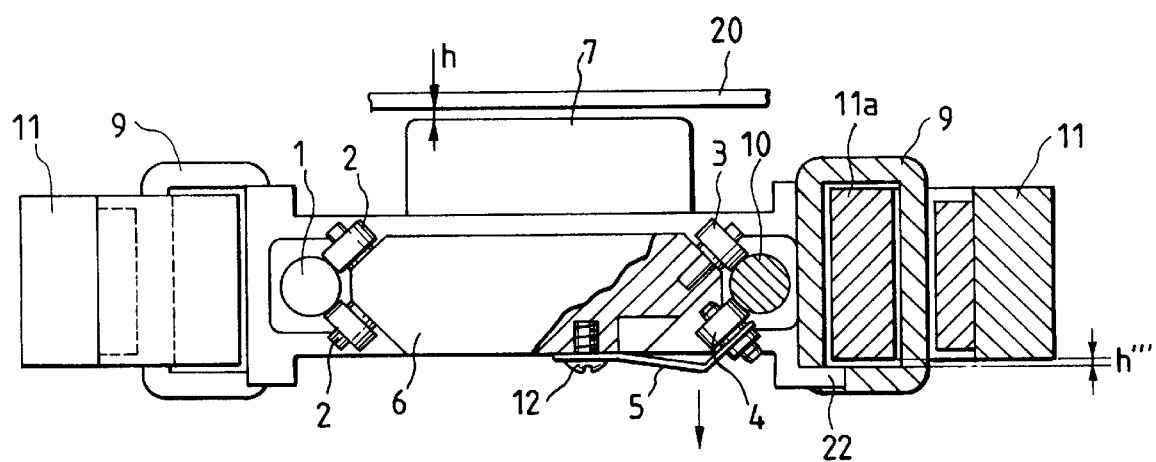

The embodiments as shown in FIG. 8 and FIG. 9 are provided with means for preventing plastic deformation of a high-stiffness spring member used therein and for avoiding collision between a disk and a closest portion of a carriage thereto (the objective lens drive unit 7 in this example) and collision between a drive motor coil 9 for drive in the track direction and a yoke 11a set therein.

Although such affairs of collision would never occur in normal use conditions, there is a possibility thereof in assembling adjustment, in shipping, or in the occurrence of trouble. It is thus to be desired that the apparatus should have the structure as described in the following embodiments in order to be ready for such abnormal circumstances.

Specifically, FIG. 8 shows an example in which a shaft is placed through a member connecting the carriage 6 with the drive coil 9. In this example, a clearance h' between a hole through which the shaft 10 is set and the shaft is set within a range of elastic deformation of the above preloading plate spring. Further, collision of the members can be avoided if the above clearance h' is set to be smaller than a clearance h between the disk 20 and the objective lens drive unit 7 and a clearance h" between the drive coil 9 and the yoke 11.

The example of FIG. 9 is arranged to avoid the collision by such an arrangement that a restricting member 22 is projected toward the yoke 11 of the drive motor from the carriage 6. In this example, a clearance h'" between the restricting member 22 and the yoke 11 is set within the range of elastic deformation of the preloading plate spring. In this example, it is also possible similarly as in the above example that the clearance h'" is set smaller than h and smaller than h".

Although the above embodiments were described as to the preloading plate spring having a specific shape, the present invention can employ spring shapes, spring fixing positions, or mounting methods other than those as described above, of course. Namely, a necessary point is that the spring member for applying an auxiliary biasing force is adjustably set with respect to the spring member for applying the main preload force or that the spring member for applying the main preload force is provided with means for changing its fixing conditions and deformation amount.

Further, the member for restricting movement of the carriage toward the disk may have an arbitrary shape, setting number, and location thereof as long as it can restrict the clearance between the carriage and the disk-side support shaft.

In the case where the restricting member is set relative to the yoke of the drive motor, a necessary point is that the projecting, restricting member is arranged so as to restrict the movement of the carriage toward the disk relative to the yoke portion set close to the carriage, regardless of the structure and location of the motor magnetic circuit.

As described above, the optical pickup apparatus of the present invention can achieve the adjustment of the preload force of the preloading plate spring by the preloading member and can set an optimum state of the guide support for the preloading member without necessitating too of high machining and assembling accuracies. Accordingly, the invention can provide the guide portion with a low drive loss and with high stiffness support, which is low in cost, high in output, and excellent in high-speed accessibility and which can be employed for example in apparatus such as recording and/or reproducing apparatus. Although the above embodiments were described using the optical pickup apparatus, the preload adjusting mechanism of the present invention can be applied to other moving bodies necessitating the preloading mechanism.

What is claimed is:

1. An optical pickup apparatus, which is guided in a predetermined direction along a pair of guide shafts fixed to an apparatus, said optical pickup apparatus comprising:

a carriage for supporting a transducing element;

supporting means for movably supporting the carriage relative to the guide shafts;

a preloading plate spring for providing a preload on said supporting means against the guide shafts;

a screw for fixing an end portion of said preloading plate spring to said carriage;

a regulation member having two end portions, one of which comes into contact with said preloading plate spring to regulate a deformation amount of said preloading plate spring, the other end portion of said regulation member being fixed by said screw; and a spring washer disposed between said preloading plate spring and said regulation member at a position fixed by said screw, said spring washer securing said preloading plate spring, wherein an amount of screwing of said screw changes a contacting state of said regulation member to bias said preloading plate spring and to adjust the preload applied by said preloading plate spring on said supporting means.

2. An optical pickup apparatus according to claim 1, wherein said supporting means comprises a plurality of rolling members and said preloading plate spring provides the preload on selected ones of said plurality of rolling members against said guide shafts.

3. An optical pickup apparatus according to claim 1, wherein the preload of said preloading is changed plate spring by changing an amount of deformation of said preloading plate spring.

4. A moving member for moving a transducing element, the moving member being guided in a predetermined direction along a pair of guide shafts fixed to an apparatus, said moving member comprising:

supporting means for supporting said moving member, which moves the transducing element, relative to the guide shafts;

a preloading plate spring for providing a preload on said supporting means against the guide shafts;

a screw for fixing an end portion of said preloading plate spring to said moving member;

a regulation member having two end portions, one of which comes into contact with said preloading plate spring to regulate a deformation amount of said preloading plate spring, the other end portion of said regulation member being fixed by said screw; and a spring washer disposed between said preloading plate spring and said regulation member at a position fixed by said screw, said spring washer securing said preloading plate spring, wherein an amount of screwing of said screw changes a contacting state of said regulation member to bias said preloading plate spring and to adjust the preload applied by said preloading plate spring on said supporting means.

* * * * *

UNITED STATES PATENT AND TRADEMARK OFFICE
CERTIFICATE OF CORRECTION

PATENT NO. : 5,872,766

DATED : February 16, 1999

INVENTORS : MASAHIKO CHAYA

It is certified that error appears in the above-identified patent and that said Letters Patent is hereby corrected as shown below:

COLUMN 2:

line 4, "can be always" should read --always can be--.

COLUMN 4:

line 17, "of high" should read --high of--;
    line 61, "preloading is changed plate" should read --preloading plate spring is changed--; and
    line 62, "spring" should be deleted.

Signed and Sealed this

Twelfth Day of October, 1999

Attest:

*Attesting Officer*

Q. TODD DICKINSON

*Acting Commissioner of Patents and Trademarks*